United States Patent [19]
McNaney

[11] 4,214,817
[45] Jul. 29, 1980

[54] PRISMATIC LIGHT BEAM EXPANSION OR COMPRESSION SYSTEM

[76] Inventor: Joseph T. McNaney, 8548 Boulder Dr., La Mesa, Calif. 92041

[21] Appl. No.: 942,263

[22] Filed: Sep. 14, 1978

[51] Int. Cl.² .............................. G02B 5/04
[52] U.S. Cl. .................................. 350/286
[58] Field of Search ............... 350/147, 152, 157, 286, 350/182, 287; 356/350

[56] References Cited
U.S. PATENT DOCUMENTS 3,657,733   4/1972   Shapiro et al. .................. 350/152 X

FOREIGN PATENT DOCUMENTS 1428970  3/1976  United Kingdom ..................... 350/152

Primary Examiner—John K. Corbin
Assistant Examiner—Rodney B. Bovernick

[57] ABSTRACT

Optical system for providing changes in a cross sectional dimension of a substantially collimated monochromatic beam of light by allowing the beam to be directed repeatedly, at Brewster's angle, toward and incident upon a common air/light conducting material interface so as to provide said changes utilizing a minimum of bulk material and space while achieving a very high degree of efficiency in the transmission of light through the system.

3 Claims, 2 Drawing Figures

PRISMATIC LIGHT BEAM EXPANSION OR COMPRESSION SYSTEM

BACKGROUND OF THE INVENTION

The invention herein relates to optical systems for changing the cross sectional dimensions of a collimated beam of light set forth in applicant's application Ser. No. 787,619 and application Ser. No. 923,709 filed, respectively, Apr. 14, 1977 and July 11, 1978. In the present embodiment of the invention the applicant includes the use of light reflector means in combination with an array of light refracting surface means which extends the usefulness of the system over a wide range of beam expansion or compression needs.

SUMMARY OF THE INVENTION

A substantially collimated beam of light stemming, for example, from a laser source of radiant energy is directed along an input path of a predetermined array of light refracting and light reflecting surfaces illustrated herein and representative of at least one embodiment of the invention. When viewed in at least first and second directions the array of surfaces can be understood as having, respectively, a cross sectional configuration and a length dimension, wherein each of a plurality of light refracting and light reflecting surfaces are supported substantially parallel one with respect to the other in the direction of said length dimension. Also, the array of surfaces are optically related one with respect to the other so as to allow a beam of light entering the array along said input path at a first end of said length dimension to follow a helical path therein in the direction of said length dimension and toward an output path for said beam at the opposite end of said length dimension. In the preferred embodiment a total of three light refracting surfaces are utilized in combination with three reflecting surfaces so as to effect in an alternating manner a refracting, and thereupon, a reflecting of a beam of light along said helical path. Coincident with each refracting surface along said path the beam of light will undergo a predetermined change in a cross sectional dimension thereof, converting an otherwise circular beam along the input path to an elliptically shaped beam along the output path.

An object of the invention is to provide the maximum expansion, or compression, of a beam of light while reducing to a minimum the material bulk and space requirements of such a system.

A further object of the invention is to provide the maximum expansion, or compression, of a beam of light while achieving the highest degree of efficiency possible in the transmission of light from the input path to the output path of the system.

Still another object of the invention is to provide in such a system a capability of satisfying a wide range of light beam compression or expansion requirements.

The invention is illustrated herein to show by way of example the manner of meeting these objectives. The description which follows when read in connection with the drawing hereof will provide a better understanding of these objectives as well as an understanding of other advantages included in the invention.

DETAILED DESCRIPTION OF THE INVENTION

Figure 1:
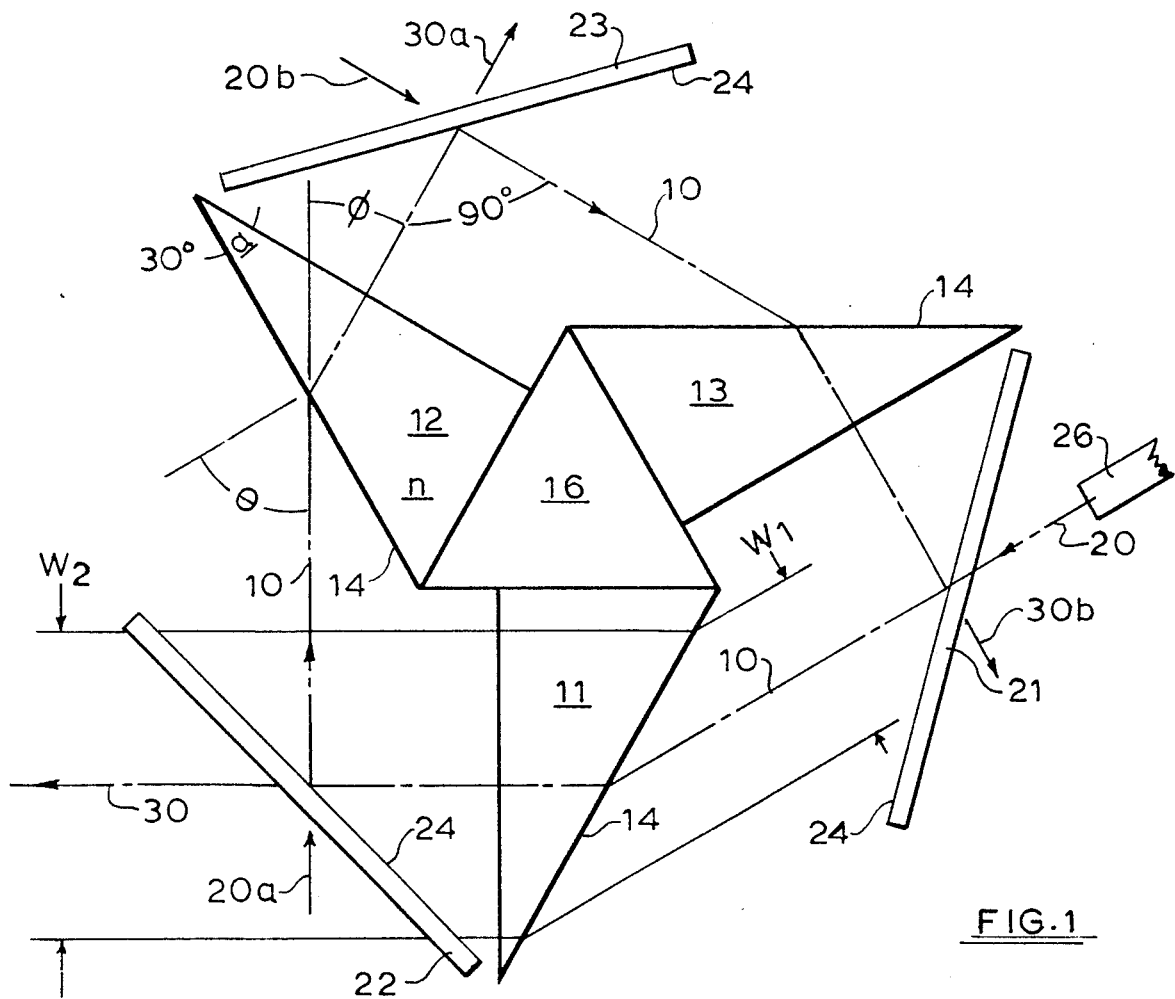
FIG. 1 is representative of a cross sectional configuration of an array of three light refracting prisms somewhat surrounded by an array of three light reflecting mirrors, each of which are optically related one with respect to the other and with respect to different ones of a number of light input and output paths.

Referring now to FIG. 1, the prismatic light beam expansion or compression system of the invention is exemplified as containing three light refracting prisms 11, 12 and 13 and three light reflecting mirrors 21, 22 and 23. In this preferred embodiment a light refracting surface 14 of each prism and a light reflecting surface 24 of each mirror are presented in an optically related formation whereby a beam of light entering the array of surfaces will be allowed to follow an optical path 10 which appears to circle its way back to its point of entry. A side view of the array of surfaces as shown in FIG. 2, however, shows that the path 10 will have stemmed from an input path 20 entering the array at an angle a, thereby allowing the beam of light to follow a helical path 10 in the direction of the length dimension L until directed to leave the array of surfaces along an output path 30.

Figure 2:
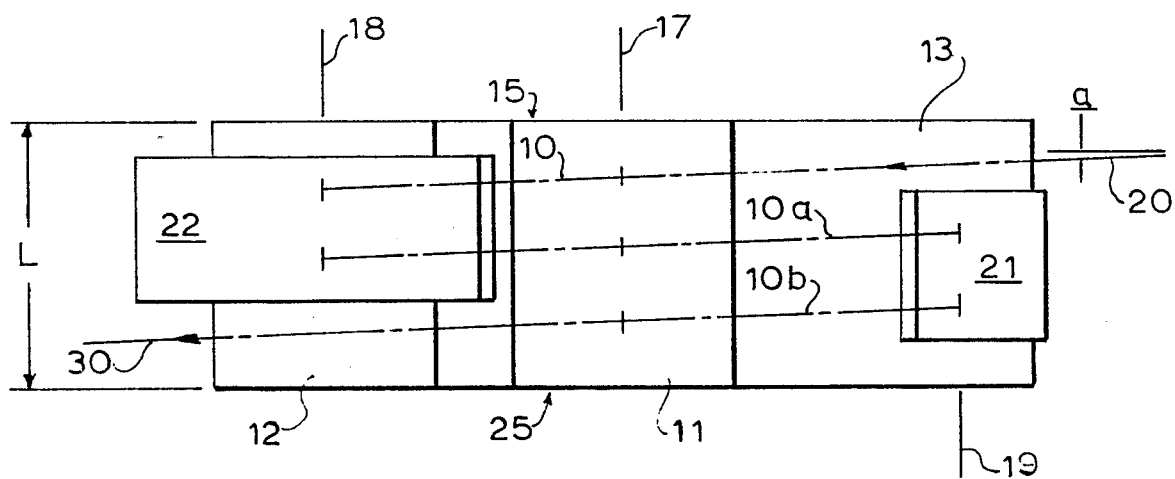
FIG. 2 is a side view of FIG. 1. The array of prisms are shown to have a length dimension L and in this view two of the mirrors are shown positioned along this length dimension.

The formation of light refracting and light reflecting surfaces is shown in FIG. 1 as presenting a predetermined cross sectional configuration and in FIG. 2 as having a length dimension L, a first end 15 and a second end 25. The actual length L, however, will be of a dimension which is considerably smaller than its cross sectional dimension. Also, each of the array of surfaces can be understood as being substantially parallel one with respect to the other in the direction of said length dimension, each surface of said array being angularly oriented one with respect to the other so as to provide an optical relationship between the input path 20 and the output path 30.

The particular embodiment of the invention illustrated in the drawing will be described as including three prisms 11, 12 and 13, each representative of right triangles, each having an index of refraction $n=1.73$ and an angle $a=30°$. Other relationships include $n=\tan \theta . \theta 1 = a + \phi =$ Brewster's angle and is that for which a light vibration having its electrical vector in the plane of incidence is refracted without reflection. Also, $\theta + \phi = 90°$ and $W_2/W_1 = n$. Each of the prisms are shown positioned along a base thereof adjacent cent a support member 16.

Depending upon the particular application requirement the optical system of this invention can be used to either expand or compress a substantially collimated beam of light in one direction, and by relatively simple adjustments of one or more of the three mirrors included in the system an extremely wide range of linearly magnified ro demagnified beams can be provided for. For example, the illustrations of FIGS. 1 and 2 have been drawn to show how a beam directed along the input path 20, having a 0.042" diameter, can be expanded in one direction to an elliptically shaped dimension of 2". As shown in FIG. 2, the input beam along path 20 encounters the refracting surface 14 of prism 11 along a line 17. From this particular input surface the beam will be refracted along the path 10 toward and incident upon the surface 24 of mirror 22 along a line 18.

After having been expanded by a factor 1.73 the beam will continue along the path 10 toward surface 14 of prism 12, refracted thereat and continue along path 10 to the surface 24 of mirror 23. After having been expanded a second time by a factor 1.73 the beam will be reflected by mirror 23 along path 10 toward surface 14 of prism 13, refracted thereat and expanded a third time by a factor 1.73. The beam will continue along path 10 toward and incident on surface 24 of mirror 21 along a line 19, completing one revolution of a helical path 10 extending in the direction of the length L of the array of surfaces. Upon reflection of the beam by mirror 21 it will continue along the path $10_a$ so as to complete a second revolution of the helical path upon its return a second time to surface 24 of mirror 21. Along path $10_a$ the beam will have been expanded fourth, fifth and sixth times, respectively, at surface 14 of the prisms 11, 12 and 13, each time by a factor 1.73. Upon the second reflection of the beam by mirror 21 it will continue along a path $10_b$ toward surface 14 of prism 11, along line 17, for a third time. The beam will be refracted thereat, for the seventh time and by a factor 1.73, and continue along an output path 30 beyond the limits of the array of surfaces.

Each time the beam is refracted at a surface 14 of a prism a first dimension $W_1$ will have been magnified to a second dimension $W_2$ where $W_2/W_1 = n = 1.73$. Prior to the seventh beam expansion the dimension $W_1 = 1.155''$ and the output beam dimension $W_2$ will be approximately 2″, and to which dimension the input beam along path 20, having a 0.042″ diameter, has been linearly magnified.

Changes in the dimension of predetermined mirrors in the direction of length L, and in their respective position along length L, will allow the invention to effect changes in a cross sectional dimension satisfying a wide range of application requirements. For example, the mirror 22 can be of a greater length so as to intercept the beam along path $10_b$ and have the beam exit the system at still another point, or, position the mirror so as to not intercept the beam along path $10_a$ and have the beam exit the system along an output path 30 extending from the path $10_a$. In the first instance the beam would be amplified further and in the second instance the beam would be subject to four stanges of amplification instead of seven as hereinbefore described. When the mirror 22 is positioned so as to not intercept the beam along path 10 the beam will be amplified but once at the surface 14 of prism 11. As noted in FIG. 1, mirror adjustments can be made whereby a beam of light will be permitted to enter the system along either one of three input paths 20, $20_a$ or $20_b$, and be permitted to exit the system along either one of three output paths 30, $30_a$ or $30_b$. Length and position of respective mirrors 21, 22 and 23 will be established accordingly.

The angle a of entry of a beam of light along the input path 20 has, as shown in FIG. 2, been greatly exaggerated. For example, the use of a laserbeam, stemming from an input source 26, having a 0.042″ diameter and utilized within a system dimensioned somewhat as shown in FIG. 1, lends itself to the use of an input angle a of 0.3°, or less, and wherein the center-to-center spacing of each revolution of the helical optical path 10 will be less than 0.075″.

In applications where it is a requirement to have the beam of light from a source 26 returned to its initial cross sectional dimension the expanded beam will be directed along an optical path 10 of a second and similarly designed system, but in the direction opposite to that indicated in the drawing and as hereinbefore set forth. The use of a cylindrical lens along an input path 20 (not shown in the drawing) will allow control of the minor axis dimension of the elliptically shaped beam and thereby compensate for any divergence of the beam through the system. Locating this lens at the point where the minor axis dimension is relatively small in relation to the focal length produces no appreciable distortion.

Although the present invention has been illustrated and described herein with respect to but a single embodiment, certain alterations and modifications of the invention will no doubt become apparent to those skilled in the arts after having read the disclosure. It is therefore intended that the appended claims be interpreted as covering all such alterations or modifications as falling within the true spirit and scope of the invention.

I claim:

1. An optical system for effecting a series of individual changes in a cross sectional dimension of a beam of light directed along an optical path therein extending from a light input path to said system to a light output path from said system, comprising:
    (a) at least three light refracting prisms, providing, respectively, first, second and third light refracting surfaces, and at least three light reflecting mirrors, providing, respectively, first, second and third light reflecting surfaces, each said refracting surface presenting a length dimension and said reflecting surfaces positioned along said length dimension;
    (b) said first, second and third refracting surfaces and said first, second and third reflecting surfaces each angularly oriented one with respect to the other so as to provide an optical relationship between said input path and said optical path and between said optical path and said output path;
    (c) whereby said beam of light is directed along said input path and thereupon along said optical path toward said output path following a predetermined angle of entry toward a predetermined one of said refracting surfaces, said angle of entry allowing the beam of light to follow said optical path forming a helix of at least one revolution, said helix extending a predetermined distance along said length dimension and said distance being directly related to said angle of entry to said beam of light;
    (d) said first, second and third light refracting surfaces positioned such that each occupies a position along said optical path for effecting said series of individual changes in a cross sectional dimension of said beam of light;
    (e) a first predetermined one of said light reflecting surfaces positioned along said length dimension so as to allow a passing of said beam of light along said input path toward said incident on a first predetermined one of said light refracting surfaces;
    (f) a second predetermined one of said light reflecting surfaces positioned along said length dimension so as to effect a reflecting of said beam of light, upon a refracting of said beam at said first predetermined one of said refracting surfaces, along said optical path toward and incident on a second predetermined one of said light refracting surfaces;
    (g) a third predetermined one of said light reflecting surfaces positioned along said length dimension so as to effect a reflecting of said beam of light, upon a refracting of said beam at said second predetermined one of said refracting surfaces, along said optical path toward and incident on a third predetermined one of said light refracting surfaces;

(h) whereby the position said first predetermined one of said light reflecting surfaces along said length dimension allows a reflecting of said beam of light, upon a refracting of said beam at said third predetermined one of said refracting surfaces, for a continuing of said beam along said optical path, whereupon the position of a predetermined one of said light reflecting surfaces along said length dimension allows a passing of said beam of light along said output path and beyond the light reflecting limits of said one light reflecting surface.

2. The optical system as claimed in claim 1, wherein said series of changes in the cross sectional dimension of said beam of light includes a series of expansions of said cross sectional dimension.

3. The optical system as claimed in claim 1, wherein said series of changes in the cross sectional dimension of said beam of light includes a series of compressions of said cross sectional dimension.

* * * * *